Feb. 4, 1969     G. W. OSTRANDER ET AL     3,425,121
METHOD OF MAKING HIGH-TEMPERATURE ENCAPSULATED APPARATUS
Original Filed Jan. 14, 1964
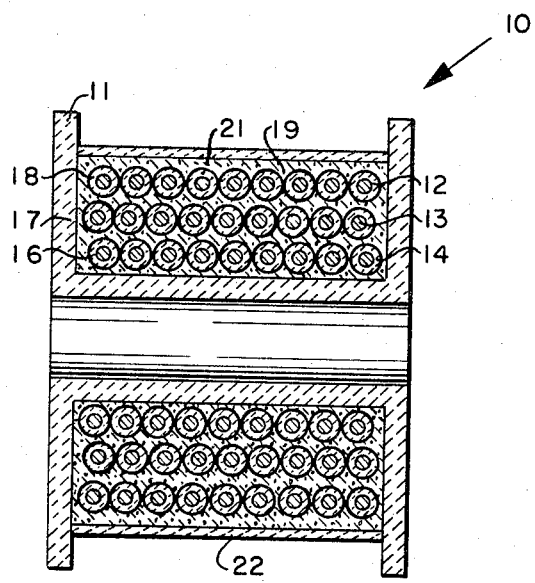
INVENTORS
GEORGE W. OSTRANDER
BY WESLEY W. PENDLETON
V. F. Volk
agent

# United States Patent Office 3,425,121
Patented Feb. 4, 1969

3,425,121
METHOD OF MAKING HIGH-TEMPERATURE ENCAPSULATED APPARATUS
George W. Ostrander, Muskegon Heights, and Wesley W. Pendleton, Muskegon, Mich., assignors to Anaconda Wire and Cable Company, a corporation of Delaware
Original application Jan. 14, 1964, Ser. No. 337,552, now Patent No. 3,308,414, dated Mar. 7, 1967. Divided and this application June 6, 1966, Ser. No. 570,103
U.S. Cl. 29—605       3 Claims
Int. Cl. H01f 5/06; C09j 5/06; B32b 31/26

Our invention relates to electrical apparatus for high-temperature service and particularly to apparatus encapsulated with a porous refractory composition.

This application is a division of application Ser. No. 337,552, now Patent No. 3,308,414, entitled, Porous-Refractory Encapsulant for Coils and Coils Encapsulated Therewith.

In the manufacture of electrical apparatus for high-temperature service it has been disclosed in applications Ser. Nos. 173,115, 207,882, 178,349 and, now Patent Nos. 3,273,225, 3,343,984 and 3,294,731, to insulate wire with an organic enamel with which there is associated a high proportion of inorganic insulant such as glass fiber or glass and refractors particles. The organic moiety is decomposed, as by oxidation, and the glass is fused to provide permanent high-temperature insulation for the conductor wires. The encapsulation of these coils has presented important problems. In the first place, since the coils are intended for high-temperature service the temperature changes are extreme and it has not been feasible to encapsulate them in a manner such that the encapsulant would not crack under the severe thermal stresses inherent in this service. Water would enter the cracks when the coil was cold and become entrapped under the encapsulant. Upon heating the coil the pressure of the entrapped steam would further damage the encapsulant and the moisture would form a conducting path between any pinholes in the insulation.

We have found that if an encapsulant that is porous to water vapor is applied to the coil, any moisture that does seep in is harmlessly expelled when the coil starts to heat, and does not build up damaging pressure. Our porous encapsulant is, furthermore, relatively resilient and can absorb thermal stresses without cracking. When our porous composition is used as the basic encapsulant of a high-temperature coil, an impervious vitreous encapsulating coating can be applied over it and the thermal stress will be so muted by the porous layer that the vitreous layer will not crack as a result of temperature cycling.

An important advantage of our encapsulated coil resides in its behavior during the decomposition of the organic moiety of the insulation. When nonporous vitreous encapsulants are used, they must be applied after the organic material has been completely decomposed but, because of its porous nature, our encapsulant can be applied prior to the decomposition of the organic matter since the combustion gasses will pass through the porous mass and oxygen can reach the organic matter to assure complete volatilization through combustion. Our encapsulant can, in fact, be applied during the winding of the coil either by coating it on an individual wire as it is being wound or, where the coil has a plurality of layers, by applying it to the surface of each layer before the next layer is started.

The encapsulating composition we prefer for the practice of our invention dries into a rigid structure at a low temperature, which is merely sufficient to evaporate and dispel the water content. This is a positive aid in the practical matter of encapsulating coils because it serves to hold them firm during the firing period before either the coil insulation or the encapsulant has fused.

Our encapsulant is in the form of a slip or slurry which, according to its concentration, can be thin or quite pasty. The pasty composition is particularly well adapted for coating a coil during the time it is being wound.

As an encapsulant, because of its porosity, our composition has enough dimensional elasticity to easily withstand the strains caused by thermal expansion and contraction of the coil, and, although we have found that any moisture that enters the coil due to the porosity of the encapsulatant is drawn out harmlessly when the coil starts to heat up, if it is deemed necessary that the coil be hermetically sealed, a vitreous coating such, for example as that described in application Ser. No. 165,392, now Patent No. 3,223,553, assigned to the assignee of the present invention, may be applied over the porous encapsulant. Such a combination of encapsulants is truly sealed because the elasticity of the primary porous encapsulant prevents the thermal strain, that might otherwise be transmitted to the vitreous layer, from cracking the latter.

We have invented an electrical apparatus comprising a plurality of turns of wire coated with inorganic, high-temperature insulation and with a porous refractory encapsulant surrounding the turns. This encapsulant comprises, by weight, 80–93 parts of $Al_2O_3$, 2–3.5 parts of $Cr_2O_3$, 0–6 parts of ZnO, and 3–10 parts of sodium silicate, and is preferably sealed with a nonporous vitreous glaze coating the encapsulant. In its most effective form our encapsulant penetrates between the layers of the coil and can be applied in the form of a slip or slurry comprising, by weight, 67–78 parts of $Al_2O_3$, 1.7–3 parts of $Cr_2O_3$, 0–5 parts of ZnO, 5–15 parts (including combined $H_2O$) of sodium silicate and 10–30 parts of water.

We have invented a method of forming a coil suitable for very high temperature service comprising the steps of forming a coil from magnet wire having an insulation comprising an organic moiety and an inorganic moiety, covering the coil with a porous encapsulating medium, and then heating the coil so as to decompose the organic moiety into gas that passes through the porous medium. In our method we further heat the coil to fuse the inorganic moiety within the porous medium, coat the coil with a vitreous slip and bake the coil so as to harden the slip into a nonporous coating. In a preferred embodiment of our method our encapsulant is in the form of a pasty slurry having the property of drying to form a rigid porous structure and prior to heating the coil high enough to decompose the organic matter we heat it only high enough to dry the slurry which forms a firm binding for the coil and insulation.

Our encapsulating composition is comprised, on a solids basis, of 80–93% $Al_2O_3$, 2–3.5% $Cr_2O_3$, 0–6% ZnO, and 3–10% sodium silicate. The latter is introduced as a solution of 1.36 sp. gr. and has an $SiO_2$ to $Na_2O$ ratio of about 3.3. Other silicate-alkali ratios may also be used in the practice of our invention, however, and we do not wish to be limited to the preferred ratio. In the formation of a slurry, the above composition is mixed with 10–30% of (free and combined) water, according to the degree of pastiness or fluidity desired.

Expressed on a wet basis an encapsulant of our invention comprises:

| | Parts by weight |
|---|---|
| $Al_2O_3$ | 67–78 |
| $Cr_2O_3$ | 1.7–3 |
| ZnO | 0–5 |
| Sodium silicate (including combined water) | 5–15 |
| Water | 10–30 |

We have found the following composition, expressed on a wet basis, to be particularly useful. This is shown in Example I.

EXAMPLE I

| | Parts by weight |
|---|---|
| $Al_2O_3$ | 70 |
| $Cr_2O_3$ | 2.2 |
| ZnO | 3.2 |
| Sodium silicate (including combined water) | 8.8 |
| Free water | 15.8 |

The above mixture is pasty enough to adhere to an insulated wire during the coiling operation and to remain in place, without dripping off, prior to drying.

The composition of Example I is characterized by its ease of application, and structural stability after the water has been evaporated and before fusing. After firing, this encapsulatant has chemical stability, structural strength, flexibility to thermal strains, and relative insolubility in water. This latter quality is due largely to the addition of ZnO. When a test block of the encapsulant of Example I was fired and submerged in boiling water for a period of two hours, its weight loss was only 0.485%, whereas a block of similar composition without the ZnO lost about 2% of its weight in the same test.

A more thorough understanding of our invention may be gained from the appended drawing. In the drawing the figure shows a sectionalized view of an encapsulated coil of our invention.

Referring to the figure, the coil, indicated generally by the numeral 10, is wound on a refractory spool 11 capable of withstanding firing temperature. An insulated magnet wire 12 comprising a conductor 13 and a glass insulation 14 is wound on the spool in the form of a coil having 3 layers 16, 17, 18. It will, of course, be understood that our invention is not limited to spooled coils or to the particular number of layers shown and will include single layer coils. It will be understood that the coil in the figure represents a condition of insulation 14 after the organic material originally present has been burned or volatilized off. An encapsulant 19 fills the interstices of the coils, coating the surfaces between the layers and forming an overall wall 21 above the surface of the coil. This encapsulant is porous and was fired at the same time the organic matter of the insulation was burned off. Because of its porosity the decomposition gasses were free to disperse without forming bubbles or cracking the outer surface of the encapsulant which may have hardened first. A vitreous glaze layer 22 is shown over the porous encapsulant 21, sealing the coil against moisture or other vapors. This layer 22 was added and fired after the completion of the other elements of the coil 10.

We have invented a new and useful high-temperature coil and method of making the same for which we desire an award of Letters Patent.

We claim:
1. The method of making an encapsulated electrical coil comprising the steps of
   (A) forming a coil from magnet wire having an insulation comprising an organic moiety and an inorganic moiety,
   (B) covering said coil with a porous encapsulating medium,
   (C) heating said coil so as to decompose said organic moiety into gas that passes through said porous medium, and
   (D) further heating said coil so as to fuse said inorganic moiety within said porous medium,
   (E) coating said coil with a vitreous slip, and
   (F) baking said coil so as to harden said slip into a nonporous coating.
2. The method of making an encapsulated electrical coil comprising the steps of
   (A) forming a multilayered coil from magnet wire having an insulation comprising an organic moiety and an inorganic moiety,
   (B) during said forming applying a pasty slurry between the layers of said coil,
      (a) said slurry having the property of drying to form a rigid porous structure, and
      (b) said structure having the property of baking to form a porous, sintered, encapsulant,
   (C) heating said coil at a temperature high enough to dry said slurry but not high enough to decompose said organic moiety,
   (D) baking said coil at an increased temperature thus decomposing said organic moiety into gas passing through said structure, and
   (E) further heating said coil so as to sinter said encapsulant.
3. The method of making an encapsulated electrical coil comprising the steps of
   (A) winding a multilayered coil from magnet wire having an insulation comprising an organic moiety and an inorganic moiety,
   (B) during said winding applying a slurry between the layers of said coil,
      (a) said slurry having the property of drying to form a rigid porous structure, and
      (b) further baking into a porous sintered encapsulant,
   (C) heating said coil at a temperature high enough to dry said slurry but not high enough to decompose said organic moiety,
   (D) baking said coil and decomposing said organic moiety into a gas passing through said structure,
   (E) further heating said coil so as to sinter said encapsulant,
   (F) coating said coil with a vitreous slip, and
   (G) baking said coil so as to harden said slip into a nonporous coating.

References Cited

UNITED STATES PATENTS

| 2,810,425 | 10/1957 | Heyman | 156—155 X |
| 2,848,794 | 8/1958 | Roth | 29—605 |
| 2,944,235 | 7/1960 | Peters | 336—205 X |
| 3,006,794 | 10/1961 | Sheldon | 174—110 X |
| 3,343,984 | 9/1967 | Saums et al. | 29—605 X |

JOHN F. CAMPBELL, *Primary Examiner.*

C. E. HALL, *Assistant Examiner.*

U.S. Cl. X.R.

156—155; 264—61, 101